L. H. SPRINKLE.
PROCESS OF CONNECTING THE BACKING AND FACING OF A TOOTH.
APPLICATION FILED NOV. 25, 1921.

1,405,874. Patented Feb. 7, 1922.

INVENTOR
Lake H. Sprinkle
BY his ATTORNEY
Israel Benjamins.

UNITED STATES PATENT OFFICE.

LAKE H. SPRINKLE, OF BROOKLYN, NEW YORK.

PROCESS OF CONNECTING THE BACKING AND FACING OF A TOOTH.

1,405,874.   Specification of Letters Patent.   Patented Feb. 7, 1922.

Application filed November 25, 1921. Serial No. 517,683.

*To all whom it may concern:*

Be it known that I, LAKE H. SPRINKLE, a citizen of the United States, whose residence and post-office address are at 310 Carlton Ave., Brooklyn, in the county of Kings and State of New York, have invented a new and useful Improvement in Processes of Connecting the Backing and Facing of a Tooth, of which process the following is a specification.

The objects of my improvement are:

First, to connect the facing to the backing, or the tooth to the plate or bridge, in such a way as not to crack the porcelain of the facing or tooth;

Second, to eliminate the platinum pins from the rear of the facing; and, third, to make the connection of the facing to the backing, or of the tooth to the plate or bridge, strong and durable and the process of connecting the facing to the backing, or of the tooth to the plate or bridge comparatively simple and inexpensive.

Figure 1:
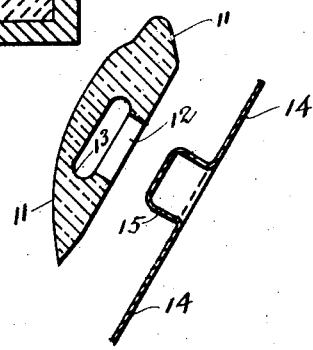
Figure 2:
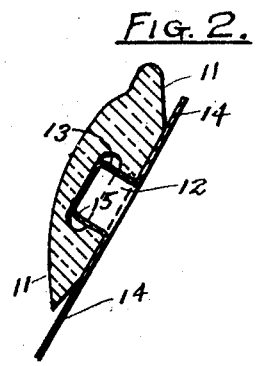

I attain these objects by the series of steps, partly illustrated in the accompanying drawings in which Fig. 1 denotes the first step of my process, and it shows the facing 11, which has embodied therein the opening 12, which has an undercut 13 at the inner end thereof; 14 is a covering, made of a thin sheet of gold or some other suitable metal, and having the cup or hollow projection 15 punched or otherwise formed therein, of a size approximately equal to that of the opening 12 of the facing 11, and adapted to be inserted into said opening, as is done in the second step of my process, as shown in Fig. 2, which shows the covering 14 with the hollow projection 15 in place in said opening 12 of the facing 11.

Figure 5:
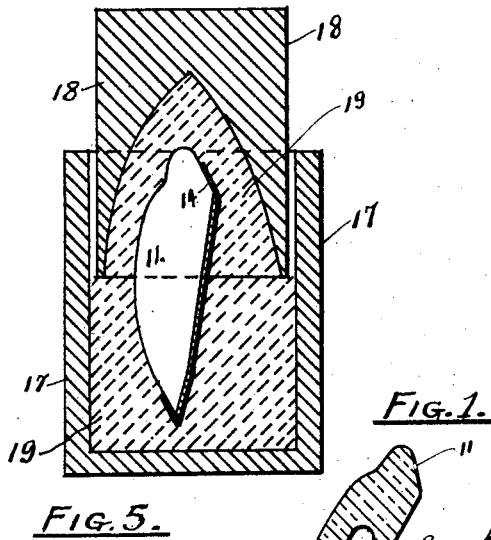

In the third step of my process the covering 14 first has its loose ends furnished on to the facing 11, which is then placed into the swage 17—18 shown in Fig. 5, which swage consists of a cylinder 17 and of a ram or plunger 18, which is hollow on the under side thereof; the void or space between the cylinder and plunger is filled with putty or some other plastic material, such as clay, and the facing or tooth 11 is first wrapped around with tissue paper or sheet rubber and then placed into the putty in the swage, and the plunger 18 is struck a few times with a wooden mallet or hammer; this causes the covering 14 with the hollow projection 15 to adhere to the facing 11, and the inner end of the hollow projection 15 is spread out into contact with the surface of the undercut 13 of the opening 12.

Figure 3:
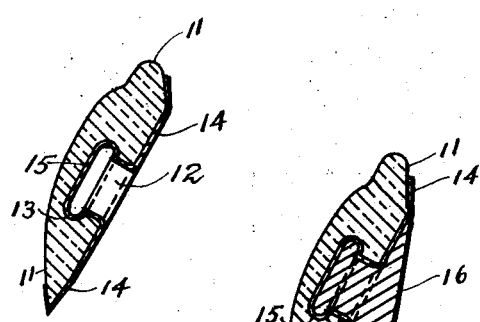

When removed from the swage the facing 11 with the covering 14 appear as shown in Fig. 3.

Figure 4:
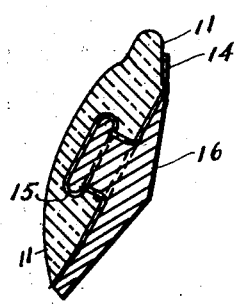

In the fourth step of my process gold solder or some other alloy is flowed into the covering 14 of the facing 11 until the opening 12 is all filled and the backing 16 is formed in the rear of the facing, as shown in Fig. 4.

All the figures of the drawings are vertical sections; but in Fig. 5 the facing or tooth is shown in elevation, and the paper or rubber wrapper of the tooth is omitted for the sake of clearness.

By the above process no platinum pins are used, and the gold solder used for flowing does not come into contact with the porcelain, as the covering 14 is not punctured by the pins; the porcelain of the facing or tooth is therefore adequately protected against cracking.

Gold foil or platinum foil may be used for the covering 14, although I prefer to use a sheet of metal somewhat heavier than foil.

Some changes might be made in some or all of the steps of my process of connecting the backing and facing of a tooth. I do not, therefore, restrict myself to the details as above described and as shown in the drawings, but I include also all mechanical equivalents and obvious modifications of the same within the scope of my invention.

What I claim as my invention and desire to secure by Letters Patent is:

1. The process of connecting the facing of a bridge tooth to the backing thereof or of a tooth to the plate or bridge, consisting of swaging a metal covering, having therein a cup or hollow projection to the facing or tooth which has embodied therein an opening with an undercut, said hollow projection being caused by the swaging to line said opening with said undercut, whereupon a suitable alloy is added unto the said covering until said opening is filled and the backing is formed.

2. The process of adding a suitable metal alloy unto a facing or tooth of a bridge, having therein an opening with an undercut at the inner end thereof, said opening with the rear of said facing being covered with metal, the added metal of the alloy uniting with the metal of the covering to form one continuous backing for the bridge.

LAKE H. SPRINKLE.